United States Patent
Yamaguchi et al.

(10) Patent No.: US 11,481,431 B2
(45) Date of Patent: Oct. 25, 2022

(54) SEARCH CRITERION DETERMINATION SYSTEM, SEARCH SYSTEM, AND COMPUTER READABLE MEDIUM

(71) Applicant: FUJIFILM BUSINESS INNOVATION CORP., Tokyo (JP)

(72) Inventors: Akinobu Yamaguchi, Yokohama (JP); Shintaro Adachi, Yokohama (JP); Daigo Horie, Yokohama (JP); Yang Liu, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 128 days.

(21) Appl. No.: 16/841,147

(22) Filed: Apr. 6, 2020

(65) Prior Publication Data

US 2021/0117464 A1   Apr. 22, 2021

(30) Foreign Application Priority Data

Oct. 18, 2019   (JP) .............................. JP2019-191528

(51) Int. Cl.
*G06F 16/00*   (2019.01)
*G06F 16/532*   (2019.01)
*G06F 16/583*   (2019.01)
*G06F 16/953*   (2019.01)
*G06V 10/40*   (2022.01)

(52) U.S. Cl.
CPC ........ *G06F 16/532* (2019.01); *G06F 16/5854* (2019.01); *G06F 16/953* (2019.01); *G06V 10/40* (2022.01)

(58) Field of Classification Search
CPC .. G06F 16/532; G06F 16/5854; G06F 16/953; G06K 9/46
See application file for complete search history.

(56) References Cited

U.S. PATENT DOCUMENTS

| | | | |
|---|---|---|---|
| 2007/0077025 A1* | 4/2007 | Mino ................. | G06F 16/5838 386/241 |
| 2008/0005105 A1* | 1/2008 | Lawler .................... | G06F 16/41 |
| 2010/0153449 A1* | 6/2010 | Baba ..................... | G06F 16/583 707/780 |
| 2011/0158533 A1* | 6/2011 | Gutelzon ............. | G06K 9/4638 382/176 |

(Continued)

FOREIGN PATENT DOCUMENTS

JP         5121917 B2     1/2013
JP      2013-254367 A    12/2013

(Continued)

OTHER PUBLICATIONS

May 11, 2021 Office Action issued in Australian Patent Application No. 2020203177.

*Primary Examiner* — Jared M Bibbee
(74) *Attorney, Agent, or Firm* — Oliff PLC

(57) ABSTRACT

A search criterion determination system includes: at least one processor configured to extract, in a case where plural images are inputted as a query, features from elements included in each image, determine at least one feature to be provided to a search engine as an input feature based on a relation between the extracted features, and transmit information based on the input feature to the search engine.

11 Claims, 16 Drawing Sheets

(56) References Cited

U.S. PATENT DOCUMENTS

| | | | | |
|---|---|---|---|---|
| 2012/0030234 A1* | 2/2012 | Ramachandrula | .. | G06F 16/5846 707/769 |
| 2012/0033852 A1* | 2/2012 | Kennedy | ................ | G06K 9/00 382/103 |
| 2012/0177294 A1* | 7/2012 | Ke | ..................... | G06F 16/5838 382/197 |
| 2014/0019484 A1* | 1/2014 | Coppin | ............... | G06F 16/5838 707/772 |
| 2015/0039583 A1* | 2/2015 | Liu | ...................... | G06F 16/951 707/706 |
| 2015/0302566 A1* | 10/2015 | Shibata | ............... | G06K 9/6255 382/159 |
| 2015/0332119 A1* | 11/2015 | Gupta | ................. | G06K 9/6217 382/195 |
| 2017/0109891 A1* | 4/2017 | Mosher | ................... | G06T 5/002 |
| 2017/0236301 A1* | 8/2017 | Kobayashi | ............. | G06T 7/579 382/103 |
| 2017/0262479 A1* | 9/2017 | Chester | .................. | G06F 16/54 |
| 2018/0189598 A1* | 7/2018 | Cheung | ............ | G06K 9/00671 |
| 2018/0204354 A1* | 7/2018 | Kimura | ..................... | G06T 7/97 |
| 2018/0341808 A1* | 11/2018 | Holzer | ................. | G06F 16/583 |
| 2019/0121879 A1* | 4/2019 | Canelis | ............... | G06F 3/0482 |

FOREIGN PATENT DOCUMENTS

| | | | |
|---|---|---|---|
| JP | 5764094 | B2 | 8/2015 |
| JP | 6445738 | B2 | 12/2018 |
| WO | 2014/009751 | A1 | 1/2014 |

* cited by examiner

FIG. 4

| INPUT INFORMATION | | EXAMPLES |
|---|---|---|
| PREMISE INFORMATION | | ADDRESS, LAND INFORMATION, PROPERTY TYPE, BUDGET, EXISTENCE OR NON-EXISTENCE OF GARDEN, EXISTENCE OR NON-EXISTENCE OF GARAGE, FAMILY STRUCTURE, THE NUMBER OF FAMILIES, ETC ··· |
| IMAGE INFORMATION | | HAND-DRAWN PICTURES, PHOTOGRAPHS, LEAFLETS, CG, ETC ··· |
| STRUCTURAL INFORMATION TEXT | | TWO-FAMILY HOUSE, 10 MINUTES WALKING DISTANCE, THREE ROOMS AND ONE LIVING ROOM WITH DINING ROOM-KITCHEN AREA, WOODEN HOUSE, ETC ··· |
| EMOTIONAL INFORMATION TEXT | | OPENNESS, FAMILY GATHERING, JAPANESE STYLE SPACE, WARMTH OF WOOD, ETC ··· |

FIG. 5
TYPE: LIVING ROOM
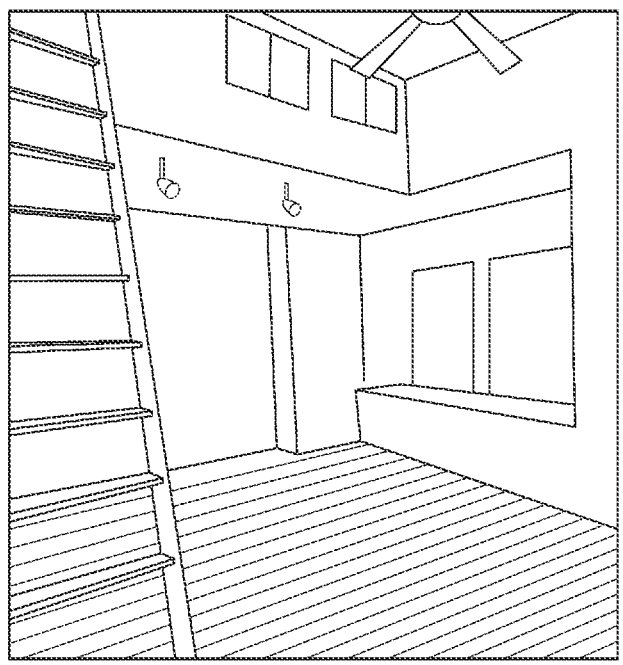
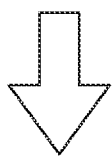 FEATURE EXTRACTION
HIGH CEILING
HIGH WINDOW
LADDER
FLOORING
WARMTH OF WOOD
OPEN
CEILING FAN
SPOT LIGHT
...

FIG. 6

| | QUERY IMAGE | FEATURES INTENDED BY USER (INCLUDING FEATURES UNRECOGNIZED), OF EXTRACTED FEATURES | FEATURES UNINTENDED BY USER, OF EXTRACTED FEATURES |
|---|---|---|---|
| #1 | | HIGH CEILING<br>HIGH WINDOW<br>FLOORING<br>WARMTH OF WOOD<br>OPEN<br>SPOT LIGHT<br>... | LADDER<br>CEILING FAN<br>... |
| #2 | | HIGH CEILING<br>WARMTH OF WOOD<br>OPEN<br>HIGH WINDOW<br>SPOT LIGHT<br>... | TOP LIGHT<br>CATWALK<br>CARPET<br>LOW WINDOW<br>EXPOSED BEAMS<br>... |
| #3 | | TWO-STORY CEILING<br>SKELETON STAIRCASE<br>FLOORING<br>WARMTH OF WOOD<br>OPEN<br>HIGH WINDOW<br>SPOT LIGHT<br>DOWN LIGHT<br>... | BOARDED CEILING<br>... |
| #4 | | TWO-STORY CEILING<br>SKELETON STAIRCASE<br>FLOORING<br>MODERN<br>HIGH WINDOW<br>SPOT LIGHT<br>DOWN LIGHT<br>... | BOARDED CEILING<br>KITCHEN<br>KITCHEN DOOR<br>... |
| ... | ... | ... | ... |

FIG. 10
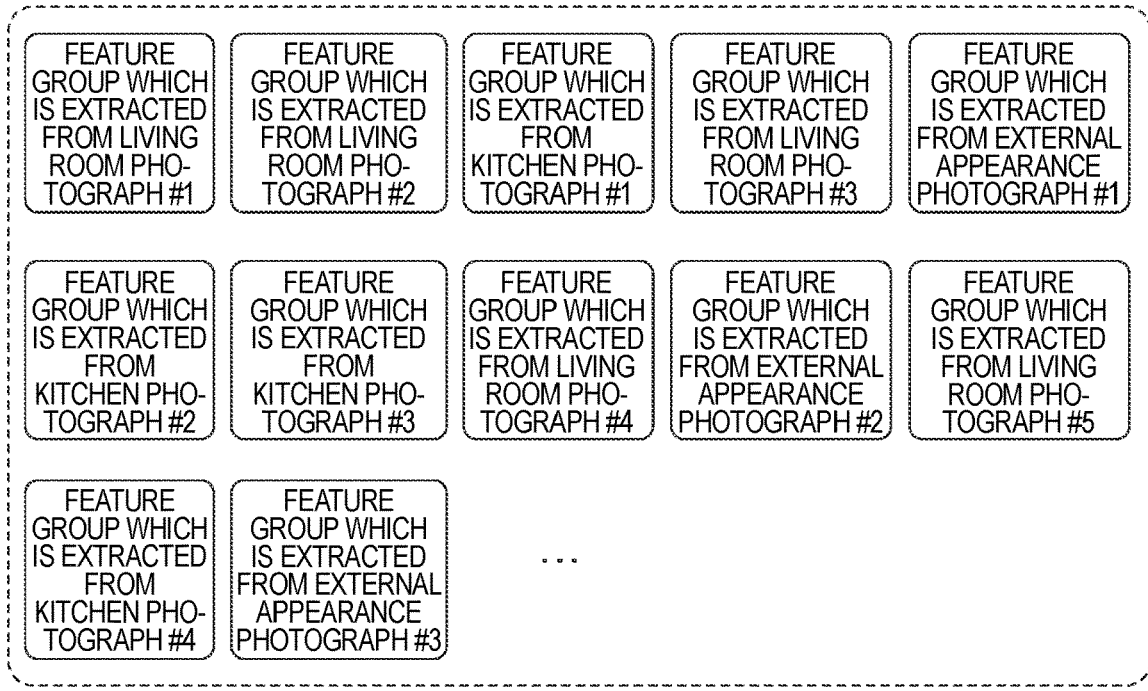
SEARCH ITEM DETERMINATION
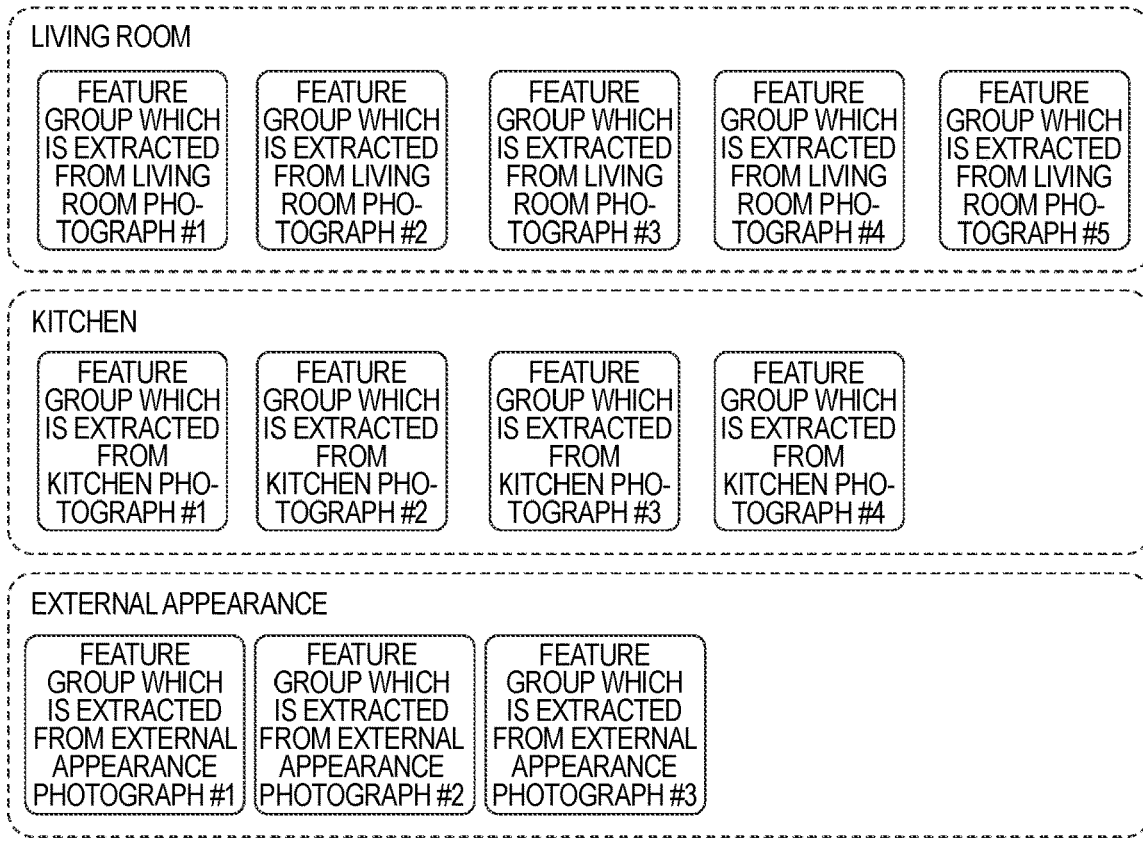

FIG. 14

SEARCH CRITERION =

◦ LIVING ROOM [IMAGE TYPE] :

◦ [PARTIAL FEATURE] "HIGH/TWO-STORY CEILING" AND "HIGH WINDOW"
　　AND "SPOT/DOWN LIGHT" AND "FLOORING" AND "SKELETON STAIRCASE"

◦ [OVERALL FEATURE] "WARMTH OF WOOD" OR "OPEN" OR "MODERN"

◦ KITCHEN [IMAGE TYPE] :

◦ [PARTIAL FEATURE]　xxx and xxx and xxx

◦ [OVERALL FEATURE] xxx or xxx or xxx

◦ EXTERNAL APPEARANCE [IMAGE TYPE] :

◦ [PARTIAL FEATURE]　xxx and xxx and xxx

◦ [OVERALL FEATURE] xxx or xxx or xxx

⋮

SEARCH CRITERION DETERMINATION SYSTEM, SEARCH SYSTEM, AND COMPUTER READABLE MEDIUM

CROSS-REFERENCE TO RELATED APPLICATIONS

This application is based on and claims priority under 35 USC 119 from Japanese Patent Application No. 2019-191528 filed on Oct. 18, 2019.

BACKGROUND

Technical Field

The present invention relates to a search criterion determination system, a search system, and a computer readable medium.

Related Art

In image search, images are inputted as queries (for example, please see JP-A-2013-254367). A user may input plural images in order to accurately reflect the intention of the user.

SUMMARY

Most of images inputted by a user as queries include not only information intended by the users but also information unintended by the users. For this reason, in a case where a user inputs plural images as a query, features unintended by the user are likely to be used. As a result, images unintended by the user may be included in search results.

Aspects of non-limiting embodiments of the present disclosure relate to facilitation of obtaining search results intended by a user as compared to the case where all features included in plural images input as queries are used as search criteria.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a search criterion determination system comprising: at least one processor configured to extract, in a case where plural images are inputted as a query, features from elements included in each image, determine at least one feature to be provided to a search engine as an input feature based on a relation between the extracted features, and transmit information based on the input feature to the search engine.

BRIEF DESCRIPTION OF DRAWINGS

Exemplary embodiment(s) of the present invention will be described in detail based on the following figures, wherein:

FIG. 4 is a table for explaining information which may be inputted as queries from a terminal which a user operates;

FIG. 5 is a view for explaining an example of feature extraction performed by a feature extracting unit;

FIG. 6 is a table for explaining one of causes which may reduce the accuracy of search;

FIG. 10 is a view for explaining the outline of a process performed by a search item determining unit;

FIG. 14 is a view for explaining an example of search criteria which may be provided to the search engine;

DETAILED DESCRIPTION

Now, exemplary embodiments of the present invention will be described with reference to the drawings.

Hereinafter, an image search system intended for use in architect offices and design offices will be described.

Architect offices and so on have records on cases handled in the past. Such information include not only images such as design plans and blueprints but also documents such as records on complaints received from customers, accident cases, and in-house reviews. The image search system to be described in the present exemplary embodiment uses such information to support an improvement in the efficiency of design tasks.

<System Configuration>

Figure 1:
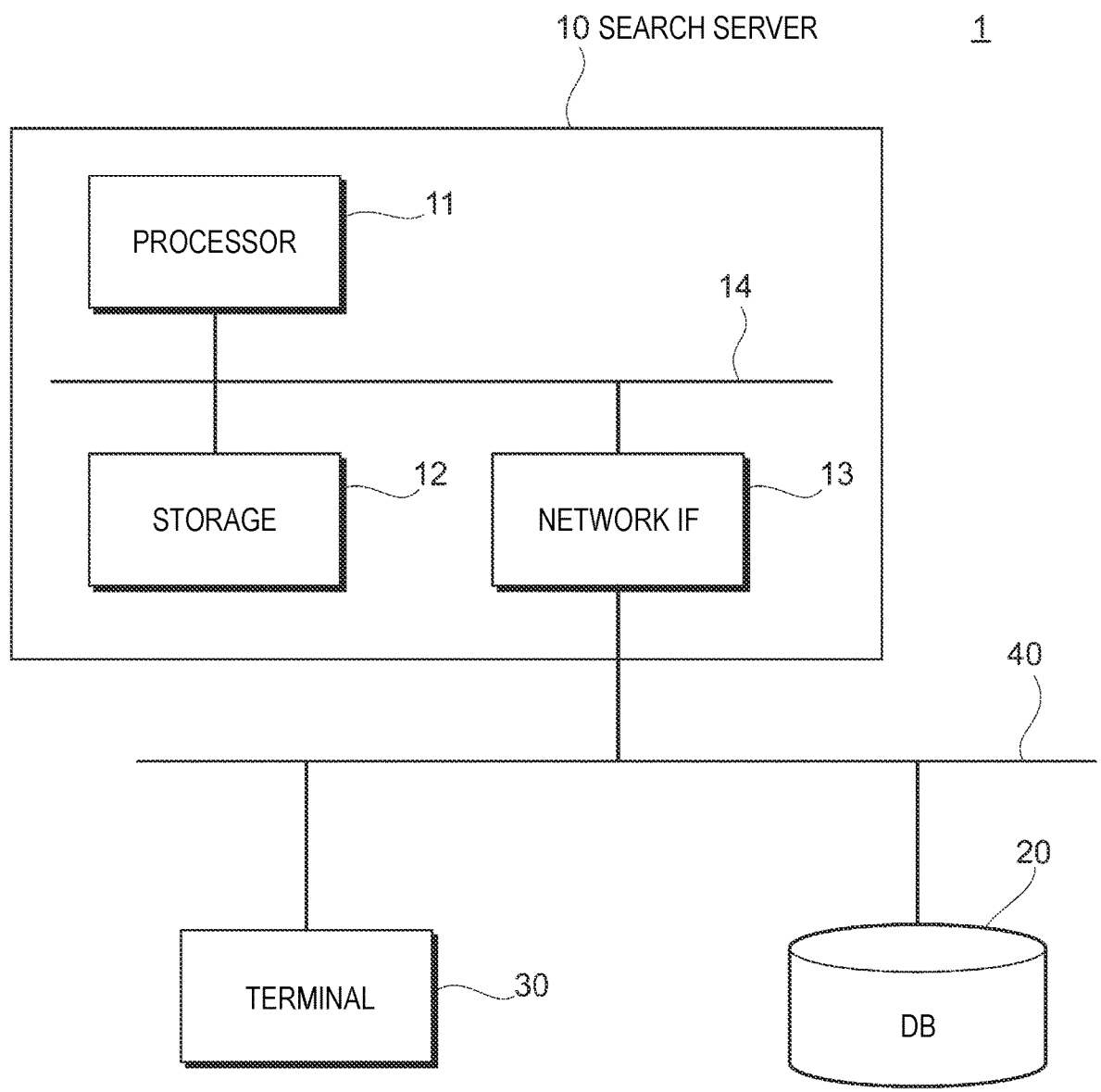
FIG. 1 is a view illustrating a configuration example of an image search system which is used in an exemplary embodiment.

FIG. 1 is a view illustrating a configuration example of an image search system 1 which is used in the present exemplary embodiment.

The image search system 1 shown in FIG. 1 includes a search server 10 for searching for images similar to or related to input queries, a database (Data Base) 20 for storing data on images (hereinafter, referred to as image data) as objects of search, a terminal 30 configured to be operated by a user to input queries, and a network 40 connecting them in a communicable manner. The network may be a local area network, or may be the Internet. The image search system 1 is an example of a search system.

The search server 10 shown in FIG. 1 includes a processor 11 for performing searches and other processes by executing programs, a storage 12 for storing the programs and a variety of data, a network IF (InterFace) 13 for performing communication with the outside, and a bus or other signal lines 14 for connecting them.

The processor 11 is configured with, for example, a CPU. The storage 12 is configured with, for example, a ROM (Read Only Memory) retaining a BIOS (Basic Input Output system) and so on, a RAM (Random Access Memory) usable as a work area, and a hard disk device retaining basic programs, application programs, and so on. However, the ROM or the RAM may be included in a part of the processor 11. The processor 11 and the storage 12 constitute a computer.

The database 20 shown in FIG. 1 retains not only images such as design plans and blueprints but also documents such as records on complaints received from customers, accident cases, and in-house reviews. These information items are referred to collectively as past cases.

Information items constituting past cases are associated with tags for search. As a tag for each information item, a set of feature amounts (hereinafter, referred to as features) included therein are given. In the present exemplary embodiment, sets of features are also referred to as data sets.

The terminal 30 shown in FIG. 1 is a so-called computer. The terminal 30 may be a tablet type computer, a laptop type computer, or a portable computer such as a smart phone or a wearable terminal. In FIG. 1, only one terminal 30 is shown; however, the number of terminals is arbitrary.

Also, the number of search servers 10 is not always one, and plural computers cooperating together may be provided. In the present exemplary embodiment, the search server 10 is called as an example of a search system.

<Functional Configuration>

Figure 2:
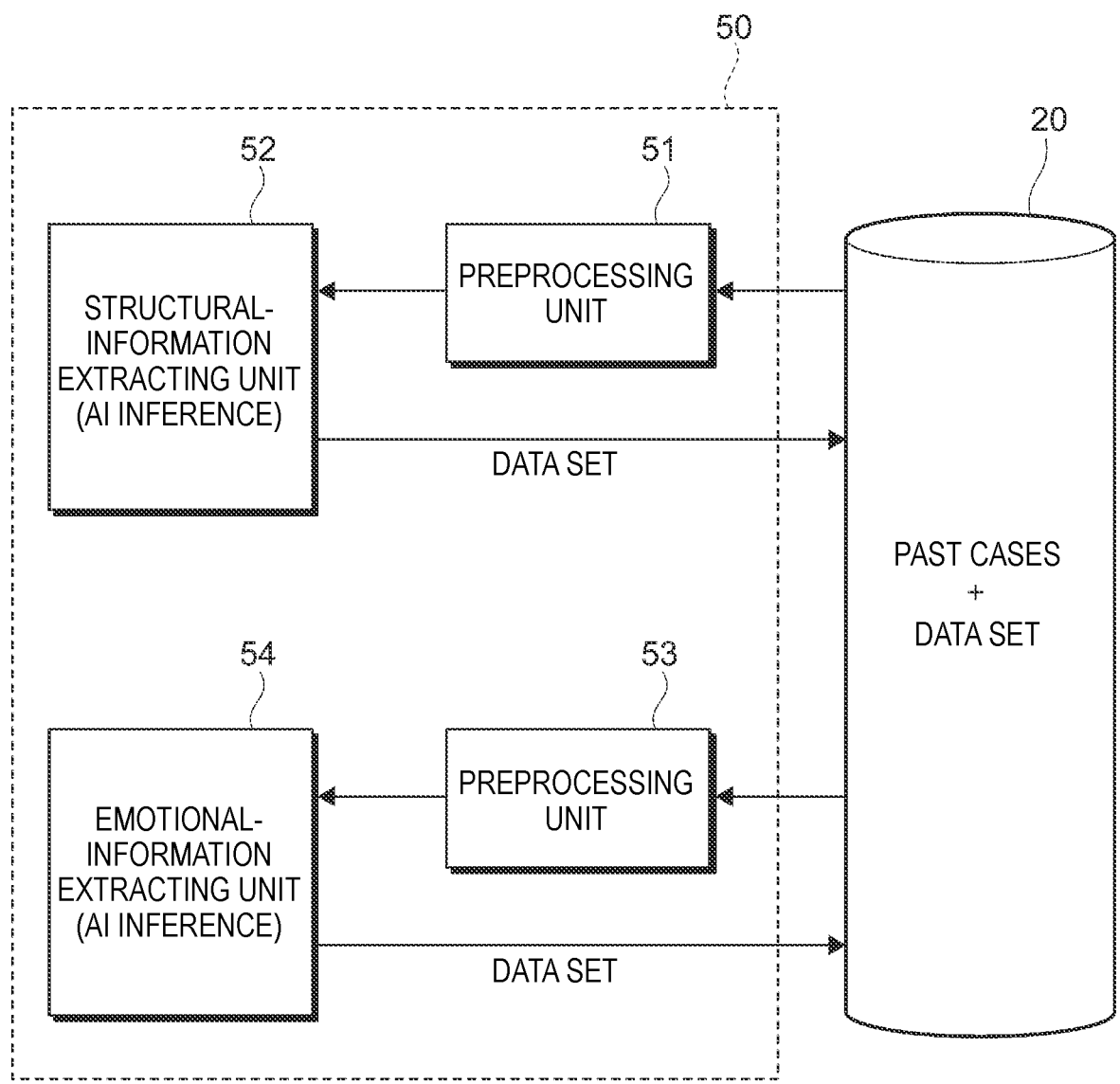
FIG. 2 is a view for explaining the functional configuration of a computer for generating data sets to be recorded in a database.

FIG. 2 is a view for explaining the functional configuration of a computer 50 which generates data sets to be recorded in the database 20.

The hardware configuration of the computer 50 is the same as that of the search server 10 shown in FIG. 1. In other words, the computer 50 includes a processor, a storage, and an interface usable for communication with the database 20.

When reading a past case from the database 20, the computer 50 preprocesses the past case with a preprocessing unit 51 for extraction of features which are classified into structural expressions (hereinafter, referred to as "structural information items"), and gives the preprocessed result to a structural-information extracting unit 52. In FIG. 2, the structural-information extracting unit 52 infers one or more features included in the past case by inference using inference models obtained by learning individual features, and outputs a set of inferred features, as a data set to be associated with the past case, to the database 20.

In the present exemplary embodiment, inference models are prepared for individual features, respectively. The inference models are generated in advance by machine learning or the like. In FIG. 2, inference using inference models is referred to as AI (Artificial Intelligence) inference.

When reading a past case from the database 20, the computer 50 preprocesses the past case in a preprocessing unit 53 prepared for extraction of features which are classified into emotional expressions (hereinafter, referred to as "emotional information items"), and gives the preprocessed result to an emotional-information extracting unit 54. In the present exemplary embodiment, emotional information means features which do not include structural expressions or quantitative expressions. In other words, emotional information means features which include qualitative or subjective expressions.

In FIG. 2, the emotional-information extracting unit 54 infers one or more emotional information items included in the past case by inference using inference models obtained by learning emotional information, and outputs a set of inferred emotional information items, as a data set to be associated with the past case, to the database 20. In the present exemplary embodiment, inference models are prepared for individual emotional information items, respectively. The inference models are generated in advance by machine learning or the like.

As described above, each past case which is accumulated in the database 20 is associated with one or more feature belonging to at least one of structural information and emotional information.

Figure 3:
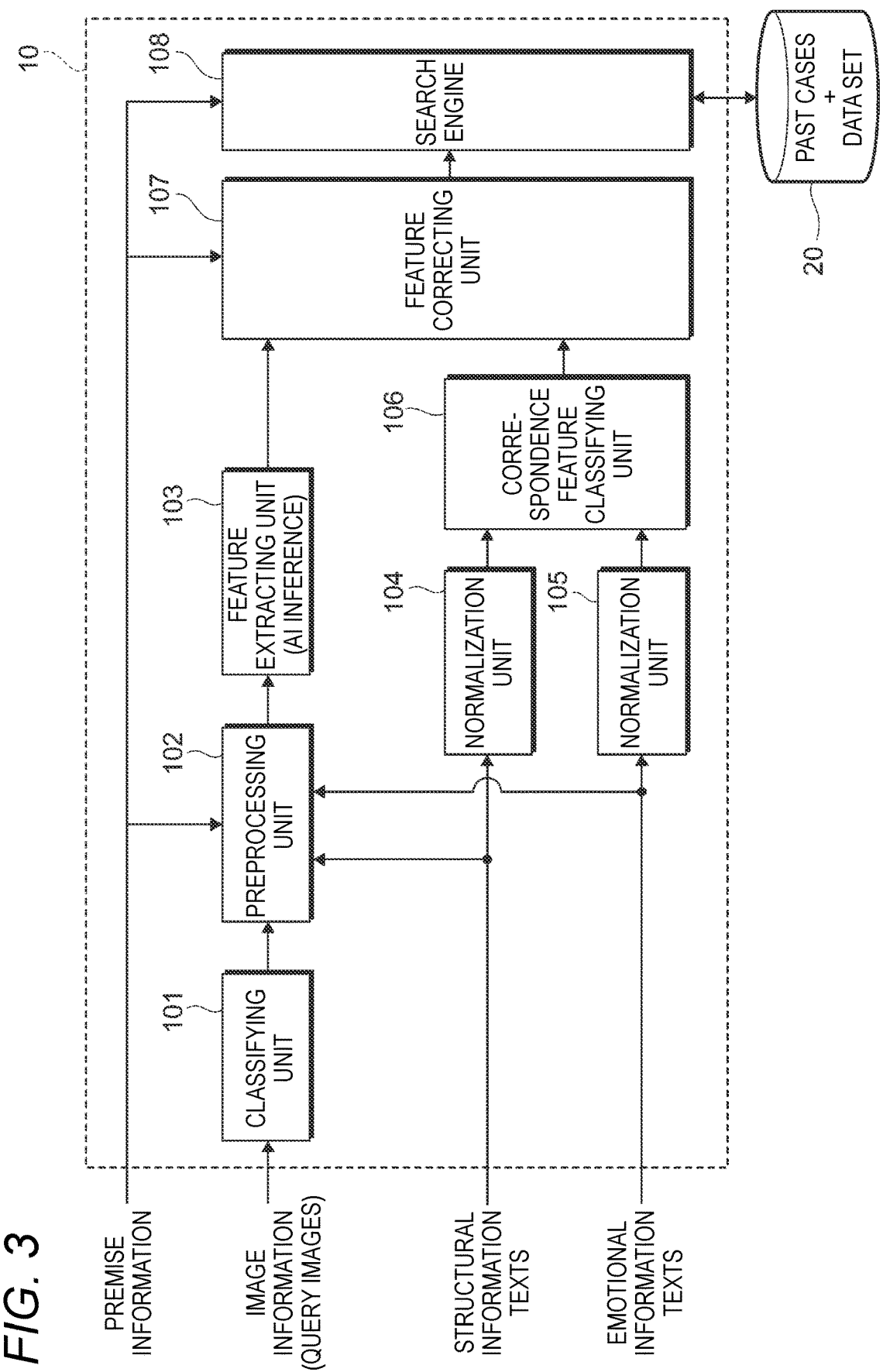
FIG. 3 is a view for explaining the functional configuration of a search server for searching a database for images similar to or related to images inputted as queries.

FIG. 3 is a view for explaining the functional configuration of the search server 10 for searching the database 20 for images similar to or related to images which are input as queries (hereinafter, referred to as query images).

The search server 10 functions as a classifying unit 101 for classifying query images by object, a preprocessing unit 102 for performing a predetermined process on query images, a feature extracting unit 103 for extracting feature amounts (hereinafter, referred to as "features") included in query images, a normalization unit 104 for correcting expressive fluctuations in texts including structural expressions (hereinafter, referred to as "structural information texts"), a normalization unit 105 for correcting expressive fluctuations in texts including emotional expressions (hereinafter, referred to as "emotional information texts"), a correspondence feature classifying unit 106 for classifying features which character strings constituting structural information texts or emotional information texts are associated with, a feature correcting unit 107 for correcting features to be given to a search engine 108, and the search engine 108 for searching the database 20 for cases highly relevant to corrected features.

These functions are realized by execution of a program by the processor 11 (see FIG. 1). The configuration of the search server 10 except for the search engine 108 is an example of a search criterion determination system.

To the search server 10 of the present exemplary embodiment, premise information, image information, structural information texts, and emotional information texts are inputted as queries (hereinafter, referred to as search queries) from the terminal 30 (see FIG. 1).

However, all of the four types of information do not need to be inputted as queries. Also, in the present exemplary embodiment, structural information texts and emotional information texts do not need to be clearly distinguished. In practice, there is no restriction on expressive types which are used in inputting texts. Therefore, without distinguishing between them, users may input requests for obtaining desired past cases by search, in character strings.

FIG. 4 is a table for explaining information which are input as queries from the terminal 30 which the user operates.

Premise information is structural or quantitative information having a high priority, of queries which the user inputs, as compared to the other queries. In premise information, laws, regulations, and so on are included. Premise information is an example of criteria related to objects of search. However, the user does not need to input laws, regulations, and so on.

In the present exemplary embodiment, images of constructions are used as objects of search.

Therefore, as premise information, for example, address, land size, site condition, environments, property type, budget, existence or non-existence of a garden, existence or non-existence of a car, existence or non-existence of a garage, a family structure, the number of families may be given. Examples of property types include buildings, condominiums, and detached houses.

Image information are so-called query images. As image information, for example, hand-drawn pictures, photographs, leaflets, and CG (computer graphics) may be given. In the case of the present exemplary embodiment, image information has lower priority as compared to the other types of queries.

Structural information texts are texts including structural expressions. As structural information texts, for example, there are texts "two-household house", "10 minutes walking distance", "three rooms and one living room with a dining room-kitchen area", and "wooden house".

Emotional information texts are texts including emotional expressions. As emotional information texts, for example, there are texts "openness", "family gathering", "Japanese style", and "warmth of wood".

Sometimes, structural information texts and emotional information texts are input without being clearly distinguished. As a text including structural expressions and emotional expressions together, for example, a text "a bright living room with openness" is exemplified. Since the expression "living room" is a noun which is clearly specified, it is a structural expression; whereas since the expressions "openness" and "bright" are adjectives representing sensual states, they are emotional expressions.

FIG. 3 will be further described.

The classifying unit 101 classifies query images inputted by the user, by object. In the present exemplary embodiment, each query image is classified into one of a building image category, a kitchen image category, and an external appearance image category. Naturally, the number of candidates for categories which images are classified into is not limited to three. As other candidates, candidates "Child's Room", "Bedroom", "Bathroom", "Toilet", "Entrance", "Garden", or the likes may be exemplified. The classifying unit 101 adds classification results as attributes of individual query images.

The preprocessing unit 102 performs a predetermined process on each input query image. Examples of the predetermined process include size adjustment, contrast adjustment, edge enhancement, noise removal, etc.

Besides, in the preprocessing unit 102 shown in FIG. 3, a function of removing parts contradicting any other criterion from query images is prepared as one of preprocessing. For example, in the case where a garage is included in a query image although it is defined in premise information that a garage is unnecessary, the preprocessing unit 102 performs correction for removing the garage part from the query image. Here, when one is referred to as contradicting another, both are not met at the same time, or do not coexist. Also, in the present exemplary embodiment, contradicting parts are also referred to as non-consistent parts.

However, correction on parts contradicting other criteria is not essential.

The feature extracting unit 103 extracts one or more features included in each query image by collating with inference models prepared for individual features by machine learning or the like.

FIG. 5 is a view for explaining an example of feature extraction which is performed by the feature extracting unit 103. In FIG. 5, from a living room photograph input as a query image, features "High Ceiling", "High Window", "Ladder", "Flooring", "Warmth of Wood", "Open", "Ceiling Fan", "Spot light", etc. are extracted as features.

FIG. 3 will be further described.

The normalization unit 104 corrects expressive fluctuations in structural information texts input as queries by the user. For example, character types are unified, i.e. fluctuations in spellings and notations are absorbed.

The normalization unit 105 corrects expressive fluctuations in emotional information texts input as queries by the user. Also, by the normalization unit 105, individual variations in expression are also corrected.

The correspondence feature classifying unit 106 determines whether each character string constituting a structural information text or an emotional information text corresponds to a structural feature, or to an emotional feature, or to both.

The feature correcting unit 107 performs a process of correcting features to be given to the search engine 108 such that it becomes easier to obtain search results intended by the user. The feature correcting unit 107 of the present exemplary embodiment eliminates contradictions between extracted features. For example, the feature correcting unit 107 performs correction for eliminating features contradicting premise information, from features extracted from query images. Also, for example, the feature correcting unit 107 performs correction for eliminating features contradicting between plural query images.

<Process of Correcting Features>

Hereinafter, correction for eliminating causes to contribute to search results unintended by the user from features extracted from query images will be described.

FIG. 6 is a table for explaining one of causes which reduce the accuracy of search.

In FIG. 6, the case where living room photographs have been given as query images is assumed. Query images are used to convey nuance that the user cannot express in words, and a lot of query images include not only information intended by the user but also information unintended by the user.

For example, from Query Image #1, features "Ladder" and "Ceiling Fan" unintended by the user are extracted. Also, from Query Image #2, similarly, features "Top Light", "Catwalk", "Carpet", "Low Window", and "Exposed Beams" unintended by the user are extracted. From each of Query Images #3 and #4, one or more features unintended by the user is extracted.

By the way, in features which are intended by the user, features which are extracted without being recognized by the user may be included.

As described above, in every image, features unintended by the user are included. Therefore, if all of features which are extracted by the feature extracting unit 103 (see FIG. 3) are used for search, it becomes easier for images irrelevant to the intention of the user to be included in search results.

In the present exemplary embodiment, features which appear in plural query images at high frequencies are treated as features intended by the user, and features which appear at low frequencies are treated as features unintended by the user.

Also, in the present exemplary embodiment, in order to improve the accuracy of distinguishing features intended by the user and features unintended by the user, a method of classifying features which are extracted from query images by objects of the query images is adopted.

Figure 7:
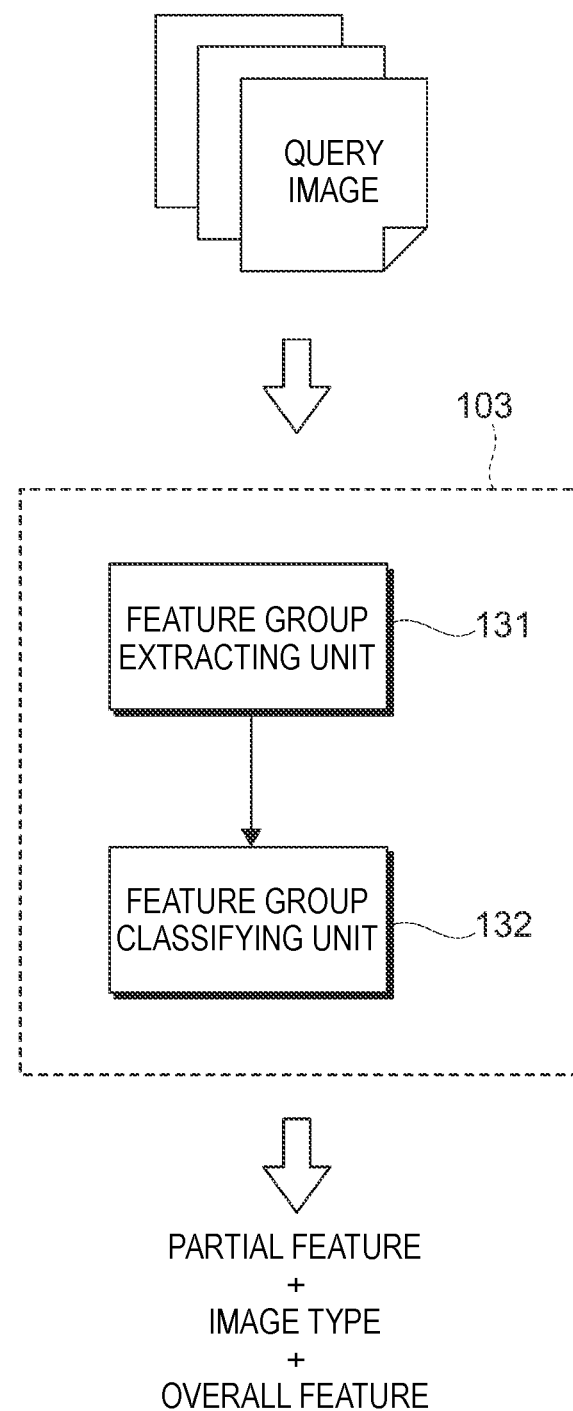
FIG. 7 is a view for explaining the outline of a process performed by the feature extracting unit in the exemplary embodiment.

FIG. 7 is a view for explaining the outline of a process which is performed by the feature extracting unit 103 (see FIG. 3) which is used in the exemplary embodiment.

The feature extracting unit 103 includes a feature group extracting unit 131 for extracting feature groups from query images, and a feature group classifying unit 132 for classifying the feature groups into categories.

The feature group extracting unit 131 extracts features from each query image by collating with the prepared inference models. Here, one or more features which are extracted is referred to as a feature group regardless of the number of features.

The feature group classifying unit 132 of the present exemplary embodiment classifies each feature constituting a feature group into one of an image type category, an overall feature category, and a partial feature category.

The image type category is a category related to objects of query images. In the case of the present exemplary embodiment, for image types, parts of constructions are used. For example, living rooms, kitchens, external appearances, etc. are used. With respect to one query image, one image type is determined.

The overall feature category is a category related to impressions which are received from query images. For example, features "Warmth of Wood" and "Open" are classified into the overall feature category. One query image may be associated with plural overall features.

The partial feature category is a category related to parts constituting query images. For example, objects, arrangements, and structures which are included in query images are classified into the partial feature category. One query image may be associated with plural partial features.

In FIG. 7, the feature group extracting unit 131 and the feature group classifying unit 132 are used to classify each feature group into one of three categories. However, from input query images, features corresponding to the categories may be directly extracted.

Figure 8:
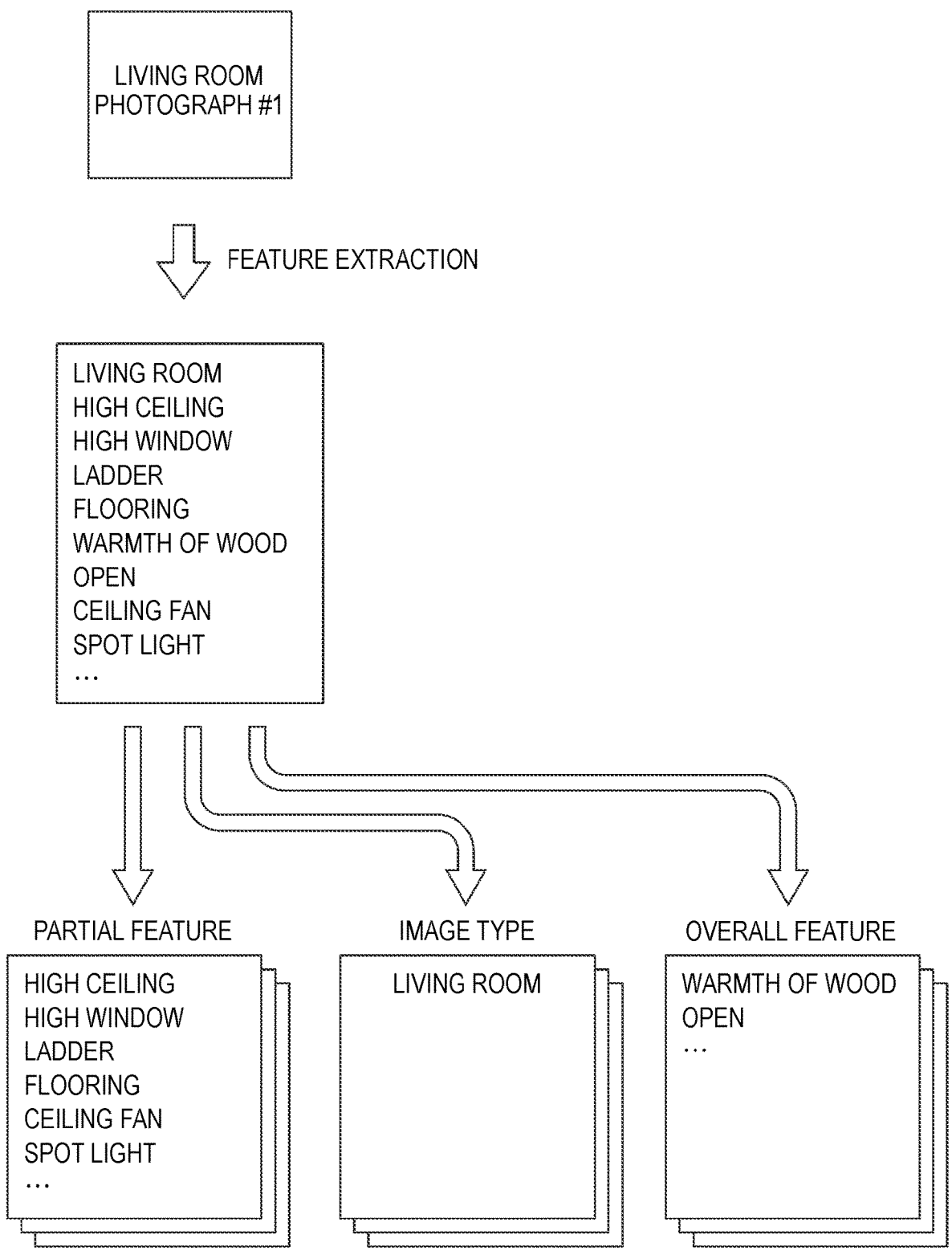
FIG. 8 is a view for explaining a classifying operation performed by a feature group classifying unit.

FIG. 8 is a view for explaining the classifying operation of the feature group classifying unit 132.

In the case of FIG. 8, the case where a query image is Living Room Photograph #1 is assumed. In this example, from the query image, features "Living Room", "High Ceiling", "High Window", "Ladder", "Flooring", "Warmth of Wood", "Open", "Ceiling Fan", and "Spot light" are extracted. Of these features, the feature "Living Room" is classified into the image type category, and the features "Warmth of Wood" and "Open" are classified into the overall feature category, and the others are classified into the partial feature category.

Figure 9:
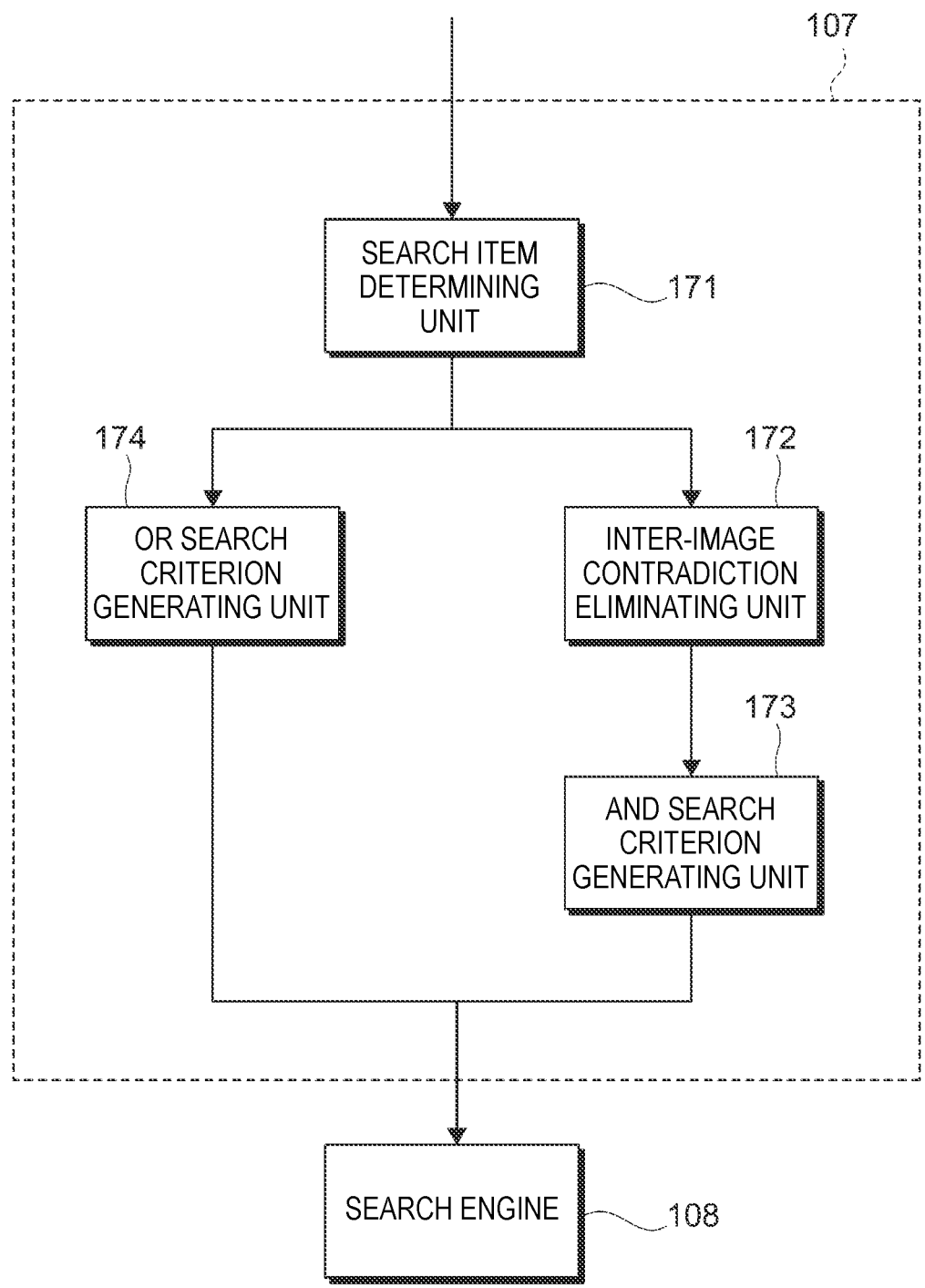
FIG. 9 is a view for explaining the contents of a process performed by a feature correcting unit used in the exemplary embodiment.

FIG. 9 is a view for explaining the contents of a process which is performed by the feature correcting unit 107 which is used in the exemplary embodiment.

In the case of the present exemplary embodiment, the feature correcting unit 107 receives feature groups from the feature extracting unit 103 (see FIG. 3) by a search item determining unit 171.

The search item determining unit 171 determines a feature group to be used for search, according to the search item setting configured by the user. In the case of the present exemplary embodiment, the search item determining unit 171 determines whether to classify feature groups which are input from the feature extracting unit 103 by image type. For example, in the case where a mode to classify feature groups by the image types has been selected, the search item determining unit 171 classifies feature groups by the types, and gives them to the subsequent processing unit.

FIG. 10 is a view for explaining the outline of a process which is performed by the search item determining unit 171. In the case of FIG. 10, the features are classified by the image types into which individual query images have been classified. In other words, the features are classified into a living room category, a kitchen category, and an external appearance category.

Meanwhile, in the case where the mode to classify feature groups by the image types has not been selected, the search item determining unit 171 gives feature groups which are input from the feature extracting unit 103 to the subsequent processing unit as they are. In the example of FIG. 10, the feature groups shown in the upper part are given to the subsequent processing unit without being distinguished.

Figure 11:
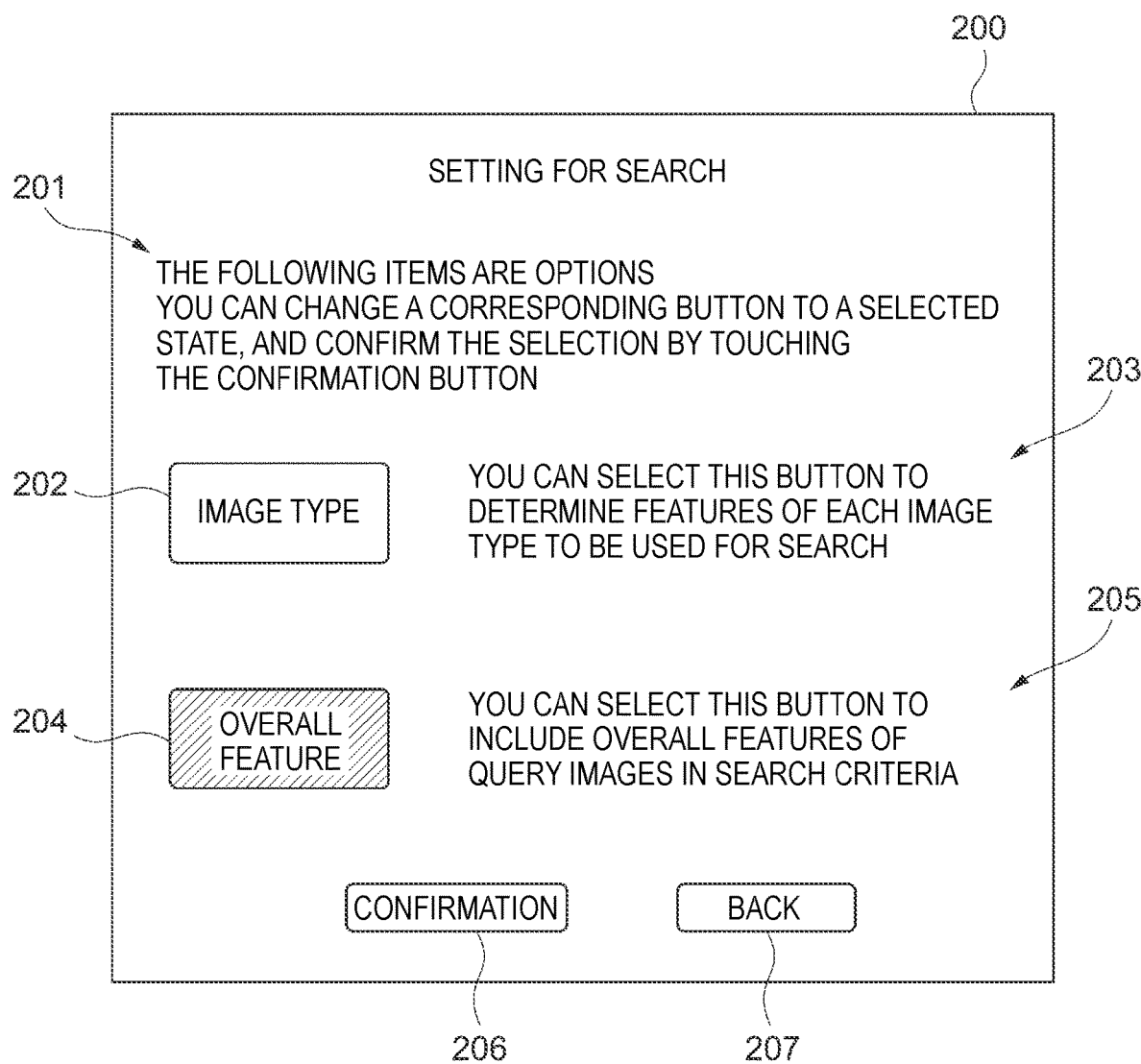
FIG. 11 is a view for explaining an example of a screen used for search setting.

FIG. 11 is a view for explaining an example of a screen 200 which is used to configure a setting for search.

The screen 200 shown in FIG. 11 includes an explanatory text 201 which explains operations which the user needs to perform, a button 202 usable to designate whether to classify feature groups by the image types, an explanatory text 203 corresponding to the button 202, a button 204 usable to designate whether to include overall features in search criteria, an explanatory text 205 corresponding to the button 204, a button 206 for confirming a selection, and a button 207 for canceling a selection and returning to the previous screen.

FIG. 11 shows a state where the button 202 has been selected and the button 204 has not been selected. If an unselected button is operated, the button transitions to the selected state. Meanwhile, if a selected button is operated, the button returns to the unselected state.

FIG. 9 will be further described.

Feature groups which the search item determining unit 171 outputs are given to an inter-image contradiction eliminating unit 172. The inter-image contradiction eliminating unit 172 eliminates contradictions between features to be causes search results unintended by the user to be obtained. The inter-image contradiction eliminating unit 172 of the present exemplary embodiment eliminates contradictions between feature groups classified into the partial feature category.

In the case of the present exemplary embodiment, whether a feature is a contradicting feature is determined with reference to the frequency of appearance.

Figure 12:
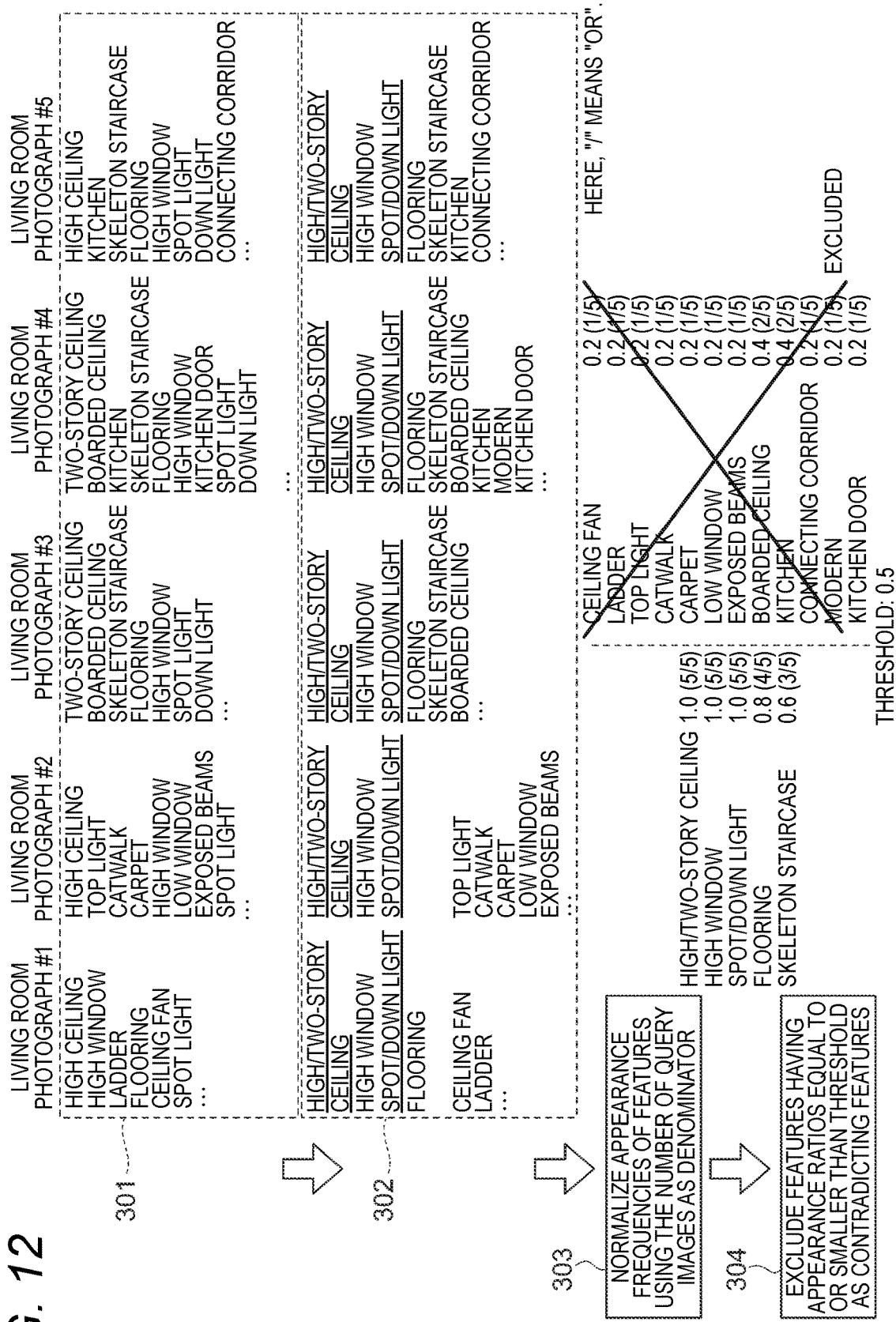
FIG. 12 is a view for explaining an example of a process which is performed by an inter-image contradiction eliminating unit.

FIG. 12 is a view for explaining an example of a process which is performed by the inter-image contradiction eliminating unit 172 (see FIG. 9).

In the case of FIG. 12, a feature group 301 consisting of partial features of query images classified into the living room category is given to the inter-image contradiction eliminating unit 172.

In the case of the present exemplary embodiment, the inter-image contradiction eliminating unit 172 generates a feature group 302 of similar features in order to reduce expressive fluctuations. Since similar features are grouped, it becomes easier for the feature appearance ratio to be determined as being high as compared to the case where grouping is not performed, and the possibility that they will be excluded from features to be used for search decreases.

In the case of FIG. 12, underlined features included in the feature group 302 are features obtained by grouping.

For example, features "High Ceiling" and "Two-Story Ceiling" are converted into a feature "High/Two-Story Ceiling". Also, for example, features "Spot Light" and "Down Light" are converted into a feature "Spot/Down Light". The mark "/" is used to mean "or".

As a result, from each of Living Room Photographs #3, #4, and #5, both of the features "Spot Light" and "Down Light" are extracted, and they are replaced with one term.

However, the process of grouping similar features may be performed only when the user selects it.

Thereafter, the inter-image contradiction eliminating unit 172 normalizes the frequency of appearance of each feature, using the number of query images as a denominator. In other words, the inter-image contradiction eliminating unit performs a process 303. Hereinafter, a normalized appearance frequency will be referred to as an appearance ratio. Appearance ratios are expressed as decimals wherein the maximum value is 1.

An appearance ratio close to 1 means that a corresponding feature is a feature common to plural query images. In other words, it means that a feature having an appearance ratio close to 1 is likely to be a feature intended by the user.

Meanwhile, an appearance ratio close to 0 means that a corresponding feature is a feature common to less query images. In other words, it means that a feature having an appearance ratio close to 0 is likely to be a feature unintended by the user.

Next, the inter-image contradiction eliminating unit 172 compares the calculated appearance ratios with a predetermined threshold, and excludes features having appearance ratios equal to or smaller than the threshold as contradicting features.

In the case of FIG. 12, the threshold is 0.5. Therefore, with respect to the five query images, five features "High/Two-Story Ceiling", "High Window", "Spot/Down Light", "Flooring", and "Skeleton Staircase" whose appearance has been verified in three or more query images are left, and the other features are excluded.

If any excluded feature remains, images unintended by the user are likely to be included in search results.

The threshold may be given as an initial value, or may be freely set by the user.

By the way, it cannot be said that plural features left by comparing the appearance ratios with the threshold does not include any contradictions. For example, both of the appearance ratio of the feature "High Ceiling" and the appearance ratio of the feature "Low Ceiling" may exceed the threshold.

If contradicting features remain, the impressions of images which are output as search results are likely to be greatly different. For this reason, in the present exemplary embodiment, if contradicting features are found, a process of leaving one of the corresponding features is adopted.

For example, one feature having a higher appearance ratio is left, and the other feature having a lower appearance ratio is excluded. Alternatively, contradicting features may be presented to the user such that the user selects one of them for example.

In a case where the difference in appearance ratio between contradicting features is smaller than a predetermined threshold, there is a possibility that the user does not regard all of those features as important. For this reason, in the case where the difference between the appearance ratios of contradicting features is small, a method of excluding both of them may be adopted.

The number of partial features which are extracted from each query image is constant, regardless of the image types. For example, the number of partial features which are extracted from each query image having the external appearance of a construction as an object tends to be smaller than the number of partial features which are extracted from each query image having a living room or a kitchen as an object.

Therefore, if a common threshold is used regardless of a difference in image type, the possibility that some features intended by the user will be excluded increases.

Figure 13:
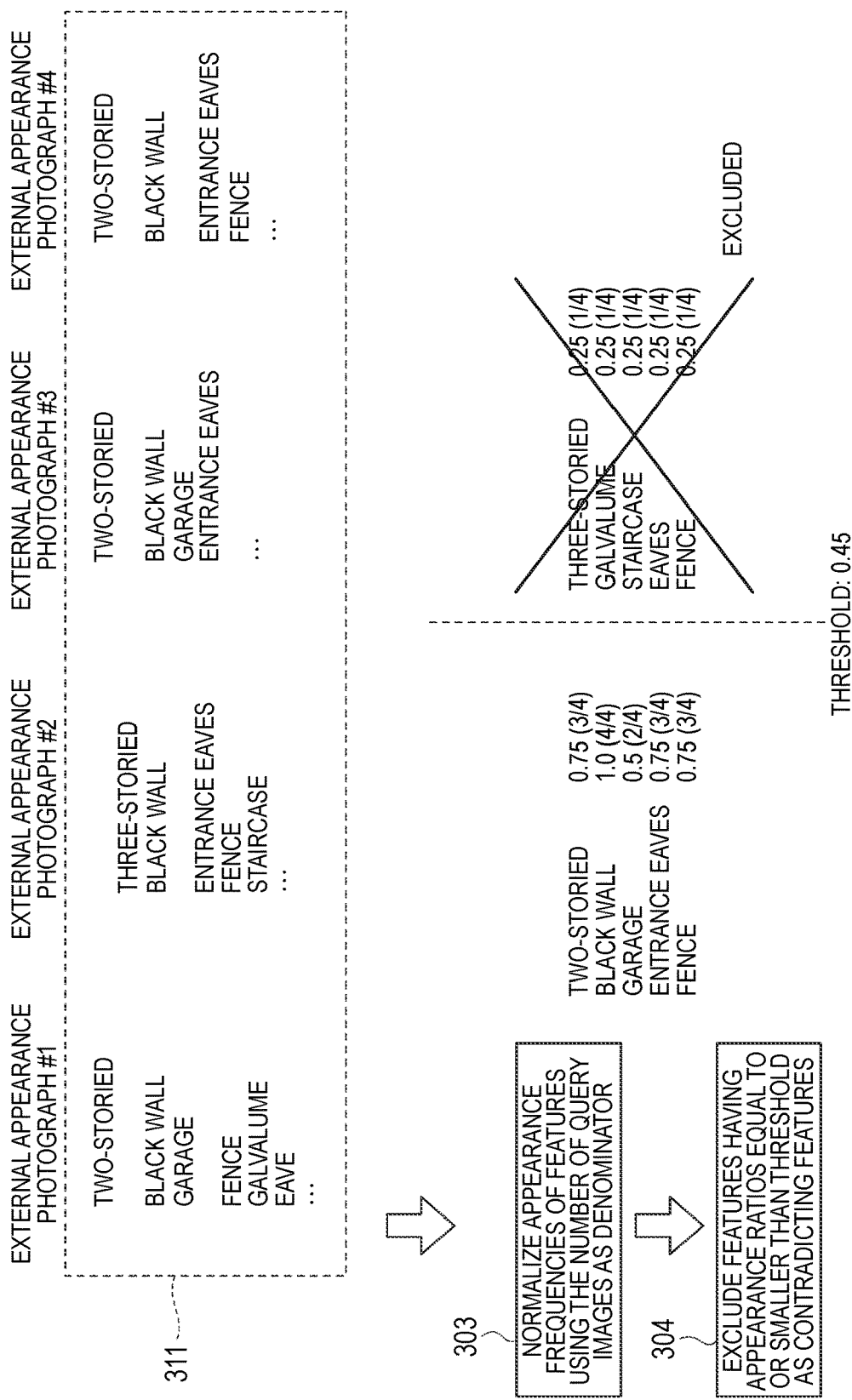
FIG. 13 is a view for explaining an example of the relation between partial features extracted from query images belonging to an external appearance image category.

FIG. 13 is a view for explaining an example of the relation between the threshold and partial features extracted from query images which are of external appearance image type.

In the case of FIG. 13, a feature group 311 consisting of partial features of the query images belonging to the external appearance category is given to the inter-image contradiction eliminating unit 172.

In the case of FIG. 13, as the threshold for appearance ratios, 0.45 is used. In FIG. 13, with respect to four query images, features "Two-storied", "Black Wall", "Garage", "Entrance Eaves", and "Fence" whose appearance has been verified in two or more query images are left, and the other features are excluded. Of the five features, the appearance ratio of the feature "Garage" is 0.5. This appearance ratio is smaller than 0.5 which is the threshold used for the living room category. As described above, the feature "Garage" is eliminated in the case where the threshold is 0.5. However, since the threshold for external appearances is used, the feature "Garage" is left.

By the way, in the example of FIG. 13, since there is no similar expressive features, grouping is not performed.

FIG. 9 will be further described.

If contradictions between the images are eliminated, an AND search criterion generating unit 173 generates the logical AND of the partial features. In the present exemplary embodiment, since search by image type has been selected, the logical AND of partial features corresponding to the same type is generated as a search criterion.

By the way, the output of the search item determining unit 171 is also given to an OR search criterion generating unit 174. The OR search criterion generating unit 174 is operated when a setting for including overall features of query images in search criteria is valid. In the case where the setting is valid, the OR search criterion generating unit 174 generates the logical OR of the overall features of each query image. The overall features of a query image are overall impressions of the query image such as "Warmth of Wood" and "Open", and are extracted, for example, using inference models.

To the search engine 108, features which are outputs of the AND search criterion generating unit 173 and the OR search criterion generating unit 174 are given.

By the way, the minimum configuration of a feature group which may be given to the search engine 108 is at least partial features which are extracted from query images. In the case of the minimum configuration, narrowing on the partial features by the image types is not performed. In this case, features left by eliminating contradictions between feature groups extracted from all query images input by the user are output to the search engine 108.

By the way, in the case where the selection for classification by the image types is valid, the logical AND of features of each type left by eliminating contradictions between features is output to the search engine 108.

Also, in the case where the selection for including overall features of images in search criteria is valid, the logic OR of the overall features of the images extracted from the images is output to the search engine 108.

FIG. 14 is a view for explaining an example of search criteria which may be given to the search engine 108. By the way, search criteria shown in FIG. 14 are examples in the case where narrowing on each image type and overall feature addition have been selected.

In the case of FIG. 14, a search criterion related to partial features of the living room category is given as the logical AND of the logical OR of "High Ceiling/Stairwell" and "High Window" and "Spot/Down Light" and "Flooring" and "Skeleton Staircase". Also, a search criterion related to overall features of the living room category is given as the logical OR of "Warmth of Wood" and "Open" and "Modern".

Search criteria related to the kitchen category and the external appearance category are omitted.

<Whole of Search Query Generating Operation>

Hereinafter, an operation example of a search query generating operation which is performed in the processor 11 (see FIG. 1) will be described with reference to FIG. 15 and FIG. 16.

Figure 15:
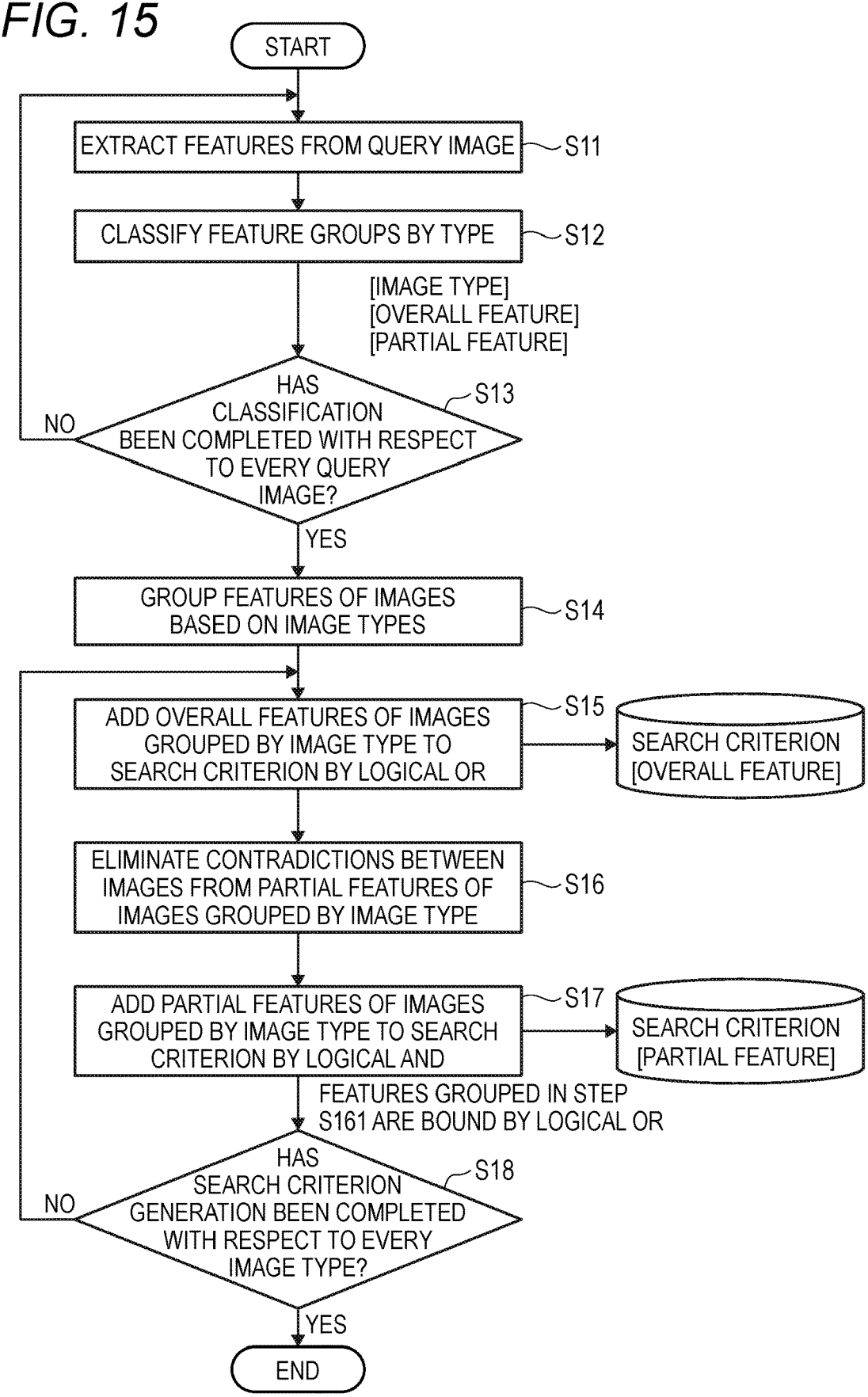
FIG. 15 is a flow chart illustrating an example of a processing operation performed when query images are given.
Figure 16:
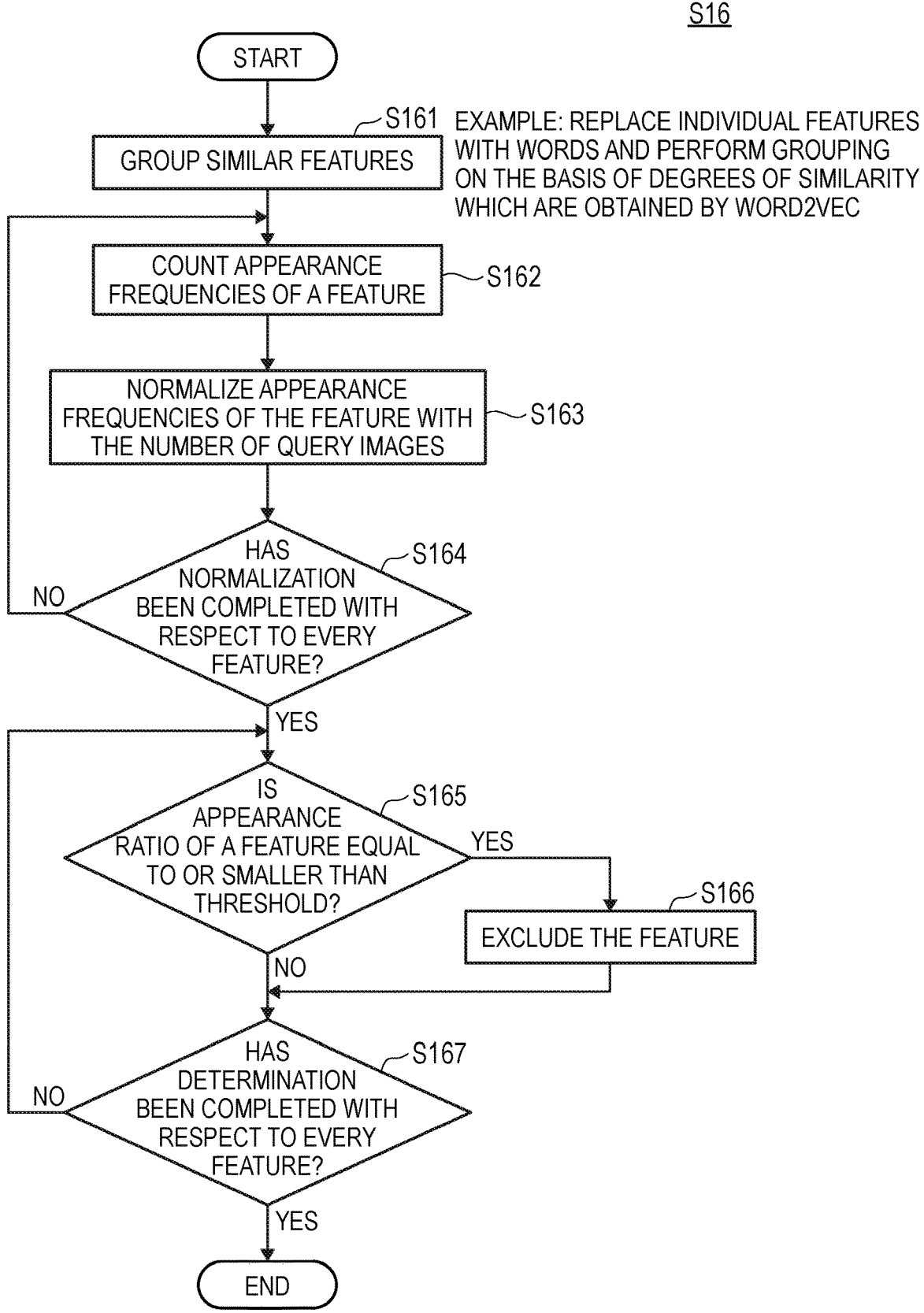
FIG. 16 is a flow chart illustrating an example of a processing operation performed by the inter-image contradiction eliminating unit.

FIG. 15 is a flow chart illustrating an example of a processing operation which is performed if query images are given. FIG. 16 is a flow chart illustrating an example of a processing operation which is performed by the inter-image contradiction eliminating unit 172 (see FIG. 9). In FIG. 15 and FIG. 16, a reference symbol "S" means a step.

When query images are input, the processor 11 extracts features from a query image (STEP S11).

Next, the processor 11 classifies feature groups by type (STEP S12). Specifically, the feature groups are classified into the image type category, the overall feature category, and the partial feature category.

Subsequently, the processor 11 determines whether classification has been completed with respect to every query image (STEP S13). In the case where any query image on which classification has not been completed remains, the processor 11 obtains a negative result in STEP S13. If obtaining the negative result, the processor 11 returns to STEP S11, and extracts features from another query image.

Meanwhile, in the case where completion of classification on every query image has been verified, the processor 11 obtains a positive result in STEP S13. In a case where the positive result is obtained, the processor 11 groups the features of the images on the basis of the image types (STEP S14).

Next, the processor 11 adds the overall features of the images grouped by image type to a search criterion by logic OR (STEP S15).

Subsequently, the processor 11 eliminates contradictions between images from the partial features of the images grouped by image type (STEP S16).

In STEP S16, the processor 11 groups similar features (STEP S161). For example, individual features are replaced with words and similar features are grouped on the basis of degrees of similarity which are obtained by Word2Vec.

Next, the processor 11 counts the appearance frequencies of the features in units of a feature group (STEP S162).

Further, the processor 11 normalizes the appearance frequencies of the features with the number of query images (STEP S163).

Thereafter, the processor 11 determines whether normalization has been completed with respect to every feature (STEP S164). In the case where there is any feature on which normalization has not been performed, the processor 11 obtains a negative result in STEP S164. In this case, the processor 11 returns to STEP S162.

Meanwhile, in the case where there is no feature on which normalization has not been performed, the processor 11 obtains a positive result in STEP S164.

In this case, the processor 11 determines whether an appearance ratio is equal to or smaller than the threshold, or not (STEP S165).

In the case where the appearance ratio is equal to or smaller than the threshold, the processor 11 obtains a positive result in STEP S165, and excludes the corresponding feature (STEP S166).

Meanwhile, in the case where the appearance ratio is larger than the threshold, the processor 11 obtains a negative result in STEP S165.

After these processes, the processor 11 determines whether determination has been completed with respect to every feature (STEP S167).

In the case where any feature on which determination has not been performed remains, the processor 11 obtains a negative result in STEP S167, and returns to STEP S165.

Meanwhile, in the case where determination has been completed with respect to every feature, the processor 11 obtains a positive result in STEP S167, and ends the process of STEP S16.

In a case where the process of STEP S16 ends, the processor 11 adds the partial features of the images grouped by image type to a search criterion by logical AND (STEP S17). By the way, the features grouped in STEP S161 are bound by logical OR.

Thereafter, the processor 11 determines whether search criterion generation has been completed with respect to every image type (STEP S18).

In the case where any image type for which a search criterion has not been generated remains, the processor 11 obtains a negative result in STEP S18, and returns to STEP S15. Meanwhile, in the case where search criteria have been generated with respect to every image type, the processor 11 obtains a positive result in STEP S18, and ends the search criterion generating process.

OTHER EXEMPLARY EMBODIMENTS

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

In the above-described exemplary embodiment, the method of excluding features regarded as contradicting between query images, using appearance ratios, is used. However, features regarded as contradicting on the basis of the relative rankings of appearance frequencies may be excluded. For example, features having a predetermined ranking or lower rankings may be excluded.

In the above-described exemplary embodiment, the image search system intended for use in architect offices and design offices has been described as an example. However, the field in which image search systems for inputting query images may be used is not limited to the construction field. For example, the present invention may also be used for web search or document search.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A search criterion determination system comprising:
    at least one processor configured to:
        extract, in a case where a plurality of images is inputted as a query, features from elements included in each image;
        determine, based on a frequency of appearance of each feature in the extracted features, at least one first feature that (i) does not contradict another feature of the extracted features, or (ii) is consistent with the other feature of the extracted features, to be provided to a search engine as an input feature, wherein
        the at least one first feature is determined by classifying the plurality of images into feature groups by type, and eliminating a feature having a frequency of appearance that is less than or equal to a threshold in each feature group; and
        transmit information based on the input feature to the search engine.

2. The search criterion determination system according to claim 1, wherein
    the at least one processor determines, as another input feature, a second feature with a frequency of appearance or an appearance ratio higher than that of a different feature of the extracted features even though the second feature contradicts or is not consistent with the different feature of the extracted features.

3. The search criterion determination system according to claim 1, wherein
    the threshold has a different value depending on a category to which each of the features belongs.

4. The search criterion determination system according to claim 1, wherein
    the at least one processor presents, to a user, a second feature with a possibility of contradicting or being inconsistent with a different feature of the extracted features, and provides the second feature to the search engine in response to the second feature being selected by the user.

5. The search criterion determination system according to claim 1, wherein
    the at least first feature includes a plurality of features with a possibility of coexisting with each other, and the at least one processor transmits the plurality of features to the search engine.

6. The search criterion determination system according to claim 1, wherein
    the at least one processor associates the extracted features with a type of the images from which the features have been extracted.

7. The search criterion determination system according to claim 6, wherein
    the at least one processor presents, to a user, a screen for receiving a selection on whether to associate the extracted features with the type of the images from which the features have been extracted.

8. The search criterion determination system according to claim 1, wherein
    the at least one processor extracts an overall feature from each image, and provides the extracted overall feature to the search engine.

9. The search criterion determination system according to claim 8, wherein
    the at least one processor presents, to a user, a screen for receiving a selection on whether to provide the extracted overall feature of each image to the search engine.

10. A search system comprising:
    at least one processor configured to:
        extract, in a case where a plurality of images is inputted as a query, features from elements included in each image;
        determine, based on a frequency of appearance of each feature in the extracted features, at least one feature that (i) does not contradict another feature of the extracted features, or (ii) is consistent with the other feature of the extracted features, to be provided to a search engine as an input feature, wherein
        the at least one feature is determined by classifying the plurality of images into feature groups by type, and eliminating a feature having a frequency of appearance that is less than or equal to a threshold in each feature group;
        transmit information based on the input feature to the search engine; and
        search at least one image similar to the images inputted as the query, using the information based on the input feature.

11. A non-transitory computer readable medium storing a program causing a computer to execute a process comprising:
    extracting, in a case where a plurality of images is inputted as a query, features from elements included in each image;
    determining, based on a frequency of appearance of each feature in the extracted features, at least one feature that (i) does not contradict another feature of the extracted features, or (ii) is consistent with the other feature of the extracted features, to be provided to a search engine as an input feature, wherein
    the at least one feature is determined by classifying the plurality of images into feature groups by type, and eliminating a feature having a frequency of appearance that is less than or equal to a threshold in each feature group; and
    transmitting information based on the input feature to the search engine.

* * * * *